F. B. SNAVELY & A. J. ULVESTAD.
CHECK ROW ATTACHMENT FOR CORN PLANTERS.
APPLICATION FILED APR. 13, 1917.
1,267,006.
Patented May 21, 1918.
3 SHEETS—SHEET 3.
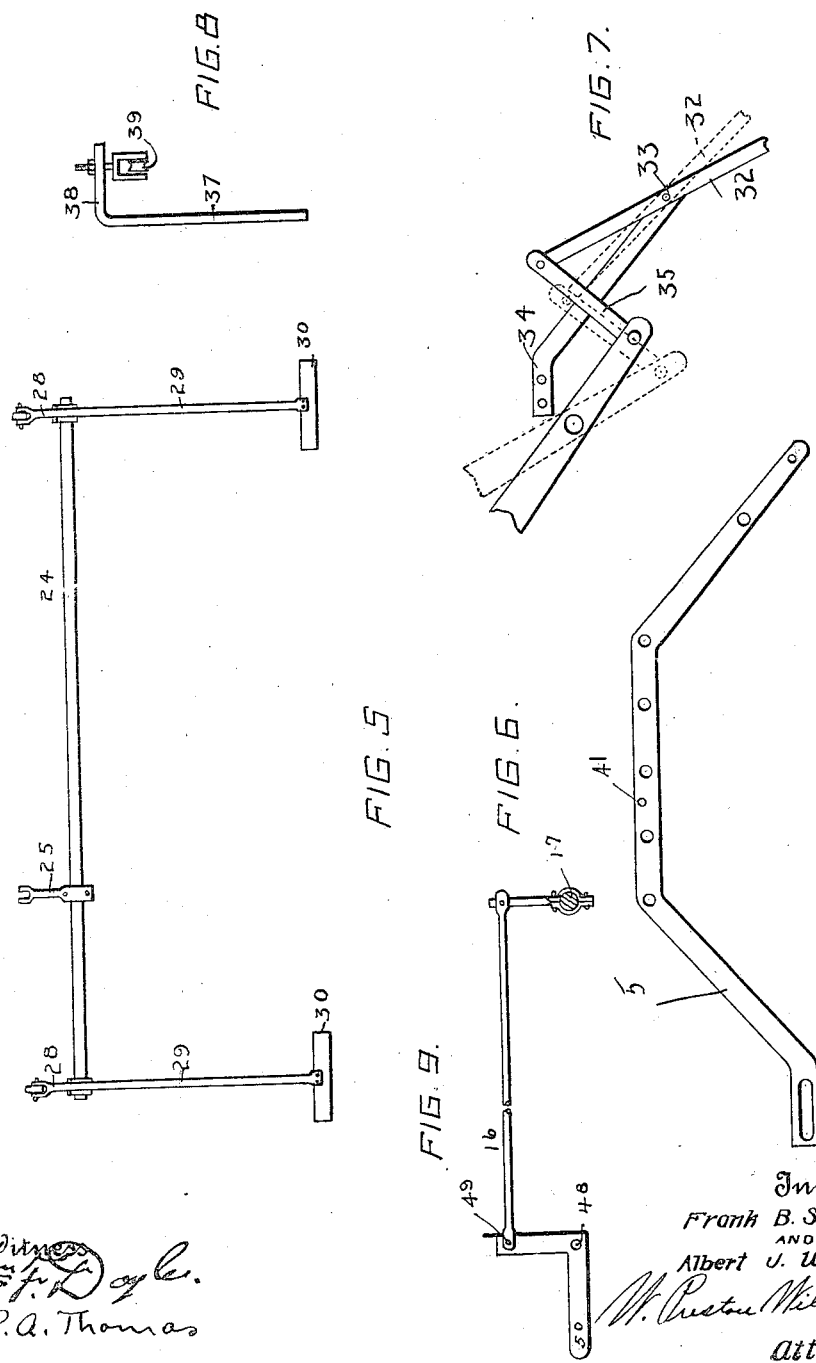
Inventors
Frank B. Snavely
AND
Albert J. Ulvestad
Attorney

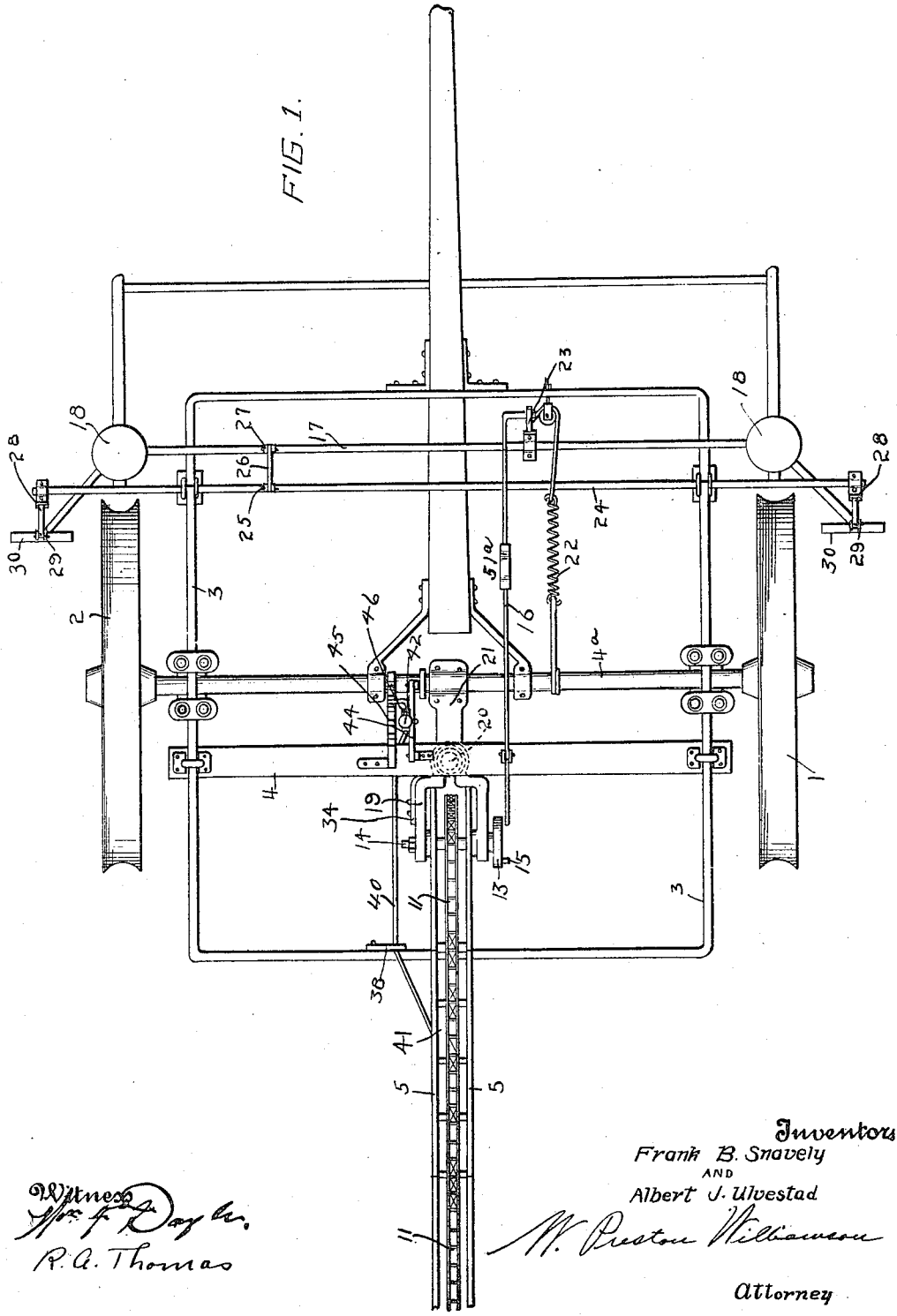

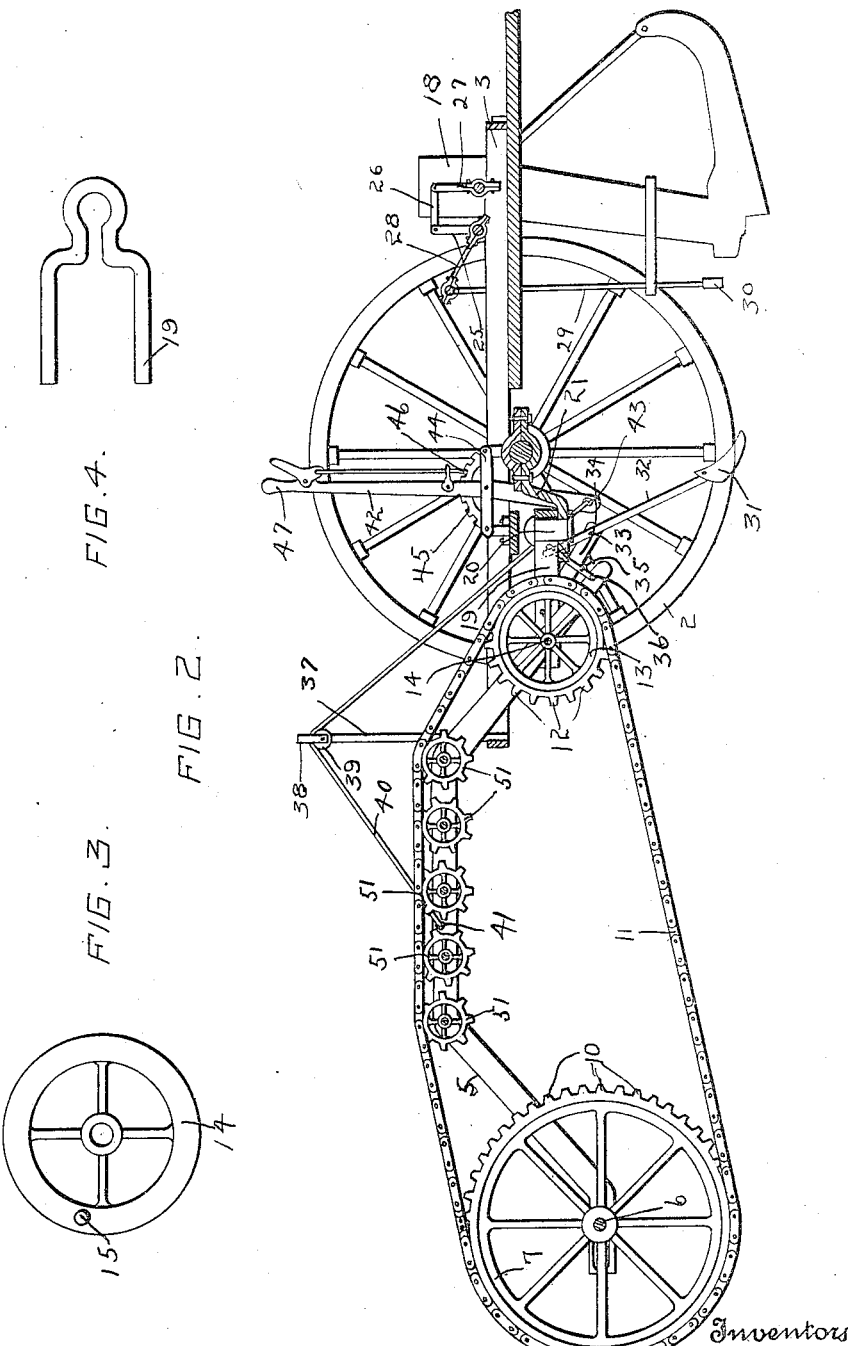

UNITED STATES PATENT OFFICE.

FRANK B. SNAVELY AND ALBERT J. ULVESTAD, OF LAKE CITY, IOWA.

CHECK-ROW ATTACHMENT FOR CORN-PLANTERS.

1,267,006.

Specification of Letters Patent. Patented May 21, 1918.

Application filed April 13, 1917. Serial No. 161,805.

*To all whom it may concern:*

Be it known that we, FRANK B. SNAVELY and ALBERT J. ULVESTAD, citizens of the United States, residing at Lake City, in the county of Calhoun and State of Iowa, have invented new and useful Improvements in Check-Row Attachments for Corn-Planters, of which the following is a specification.

Our invention relates to machines for planting corn and more particularly to check-row planters, whereby any ordinary planter may be quickly and readily attached thereto providing removable means for depositing the seed carried by the planter at predetermined intervals.

Another object of our invention is to provide means for making the locality of the hills for the purpose of displaying visibly the alinement of the hills and rows after the seed has been deposited.

With these ends in view this invention consists in the details of construction and combination of elements hereinafter set forth and particularly pointed out in the claims.

In order that those skilled in the art to which this invention pertains may understand how to make and use the same, reference is made to the accompanying drawings forming a part of this specification in which like reference characters are employed to designate like parts throughout.

Figure 1 is a top plan view of our improved planter. Fig. 2 is a sectional elevation taken on a line between the hanger 19 and the rod 16 of the same. Fig. 3 is a detail view of the actuating wheel. Fig. 4 is a detail view of the attaching clevis. Fig. 5 is a detail of the marking bars. Fig. 6 is a similar view of one of the angle bars. Fig. 7 is a similar view of the fender and Fig. 8 is a similar view of the elevator support. Fig. 9 is an elevation showing the connections for actuating the rocker shaft.

In the drawings wherein is illustrated a preferred form of our invention the numerals 1 and 2 designate traction wheels supporting the rectangular main frame 3 of an ordinary planter. Disposed within this main frame is a lateral beam 4 rigidly connected with said main frame and spaced from the rear end thereof as shown. An auxiliary frame comprising a pair of angle bars 5 supports a shaft 6 upon which is mounted a sprocket wheel 7 provided with sprocket teeth 10 which wheel is adapted to trail behind the planter and to support a sprocket chain 11 running on the sprocket teeth 10 of the wheel 7 and upon similar sprocket teeth 12 on a second sprocket wheel 13 of less diameter than the wheel 7 mounted in the auxiliary frame between the angle bars 5 forward of the wheel 7. Idler wheels 51 carry the slack of the chain 11. The sprocket wheel 13 is rigidly mounted on a transmission shaft 14 which is of a length sufficient to project beyond the auxiliary frame at one side of the wheel 13, said transmission shaft 14 having rigidly attached thereto at one end thereof, an actuating wheel 14 having formed therewith a projecting pin 15 the use of which will be hereafter more fully set forth. A bell crank lever 50 suitably attached to the beam 4 at 48 is attached at 49 to a rod 16 disposed longitudinally of the main frame 3 and is hingedly engaged at its forward extremity with a crank arm 23 on a rocker shaft 17 adapted to actuate seed boxes 18 mounted on said main frame 3 and to discharge at each oscillation of said rocker shaft a portion of the contents of said seed boxes at predetermined intervals. The lever arm 50 of the bell crank 16 is adjusted to lie in the path of the pin 15. As the mechanism for the operation of the seed boxes is no part of our present invention and as the contents of such seed boxes are discharged by various well known devices, they will not be further described.

The device comprised of the two sprocket wheels 7 and 13 supporting the sprocket chain 11 and supported between the angle bars 5 is attached to the hanger 19 formed with the strap 21 mounted on the axle 4ª and the shaft 14 of the lesser sprocket wheel exteriorly of the angle plates 5 and secured to hanger 19 by a clevis-pin 20. The rocker shaft 17 is provided with a crank arm 23 hingedly engaging the forward end of the rod 16 and a spiral spring 22 is attached to said crank arm whereby said shaft 17 is rocked alternately backward and forward by the reciprocal movement of the rod 16 in a manner hereinafter more fully explained. A turnbuckle 51ª on the rod 16 provides means for the adjustment of said rod.

Mounted on the frame 3 of the planter frame and disposed parallel to the rocker shaft 17 is a second rocker-shaft 24 provided with an upwardly projecting crank-arm 25 pivotally engaging a link 26. Said link 26 pivotally engages a similar crank-arm 27 on the rocker-shaft 17. Similarly disposed crank-arms 28 are secured to the extremities of the shaft 24 and to the extremities of the crank arms 28 are hingedly attached downwardly disposed pressure bars 29 having at their lower extremities, markers 30, adapted to be pressed down into the ground with every movement in one direction of the rocker shaft 17 and to be withdrawn from the ground by the movement of said rocker shaft in the opposite direction.

A fender 31 is attached to an arm 32 and is pivotally supported at 33 by a brace 34 rigidly attached to the hanger 19. A link 35 attached to the upper extremity of the arm 32 and to the angle iron 5 at 36 forms a toggle joint for purposes hereinafter set forth.

A vertical standard 37 attached to the main frame 3 of the planter by suitable clamps is provided with a rectangular arm 38 upon which is mounted a depending pulley 39 adapted to receive a flexible support 40 attached at the rear end thereof to the angle bars 5 at 41 its forward end passing through an aperture 43 in the lower extremity of an operating lever 42 pivotally attached to the main frame 3 at 44. A toothed sector 45 mounted on the frame 3 is engaged by a latch 46 connected to a handle 47 for elevating the sprocket wheel 7 and for upwardly displacing the check row attachment in a manner hereinafter described.

In the operation of our machine the same is drawn forwardly by horses or by other means, the auxiliary frame is attached to the beam 4 at 20 by means of the hanger 19. The sprocket wheel 7 supported in the auxiliary frame formed by the parallel angle bars 5 and supporting the sprocket chain 11 rests upon the ground, and communicates motion to the sprocket and through shaft 14 to the actuating wheel 15 which imparts a reciprocating motion to the bell crank lever 50 and the rod 16 in engagement with the crank 23, by which means the shaft 17 is rocked alternately backward and forward discharging the seed downwardly from the seed boxes 18 just in advance of the markers 30. The return movement of the rocker shaft is accomplished by the spiral spring 22 which partially rotates the rocker shaft 17 and actuates the crank 27 the link 26 and the crank 25 on the second rocker shaft 24 partially revolving the cranks 28 at the extremities of said shaft whereby the pressure bars 29 are displaced downwardly and the markers 30 on the lower extremities of said pressure bars are forced into the ground marking the position of the hill. The marker is immediately withdrawn from the ground by the succeeding forward movement of the bar 16. The upward displacement of the markers 30 is given additional impetus by the action of the spiral spring 22. The fender 31 which is placed directly in advance of the sprocket wheel 7 and which is in contact with the ground removes obstructions and marks a path of uniform depth for the wheel 7 which is of a suitable diameter to correspond to the distance between the corn rows, whereby the wheel 13 is caused to revolve once while the machine travels the distance from one row to the next and as inequalities in the ground are overcome by the action of the fender 31 seed will be discharged from the seed-boxes 18 upon the revolution of the sprocket wheel 13 integral with the actuating wheel 14 which drives the bell crank lever 50 and the rod 16 and partially revolves the rocker shaft 17 attached to said seed boxes. Having discharged the seed on the forward movement of the rod and having at the same time placed in tension the spiral spring 22, this spring assists in the return movement of the rod 16 and by means of the crank arm 27 attached to the link 26 and the crank arm 25 formed with the rocker-shaft 24 partially revolves said rocker-shaft 24.

When the planter has arrived at the end of a corn row, the sprocket wheel 7 may be lifted from engagement with the ground by means of the lever 47 having attached to its lower extremity one end of the flexible member 40 supported on the pulley 39 and the brace 37, the other end of said flexible member being attached to the auxiliary frame through an aperture 41 in one of the angle bars 5. As the rear end of the frame is elevated by the action of the lever 42, the fender 31 mounted on the arm 32 is displaced upwardly by means of the link 35 in proportion to the downward displacement of the forward end of the angle bar 5 forming part of the auxiliary frame.

Having fully described our invention, what we claim is:

1. A check row attachment for corn planters adapted to attachment to the main frame of a corn planter, comprising a pair of similar angle bars spaced apart, a sprocket wheel mounted between the angle bars at the rear end of said frame adapted to move in contact with the ground, a smaller sprocket wheel similarly mounted at the forward end of the angle bars, a traction belt in engagement with both sprocket wheels inclosed by said angle bars, a fender frame supporting said angle bars and pivoted at the forward end to the main frame, means connected with the smaller sprocket wheel for dropping corn at predetermined intervals.

2. A check row attachment for corn planters comprising an auxiliary frame for attachment to the rear of the main frame of a corn planter, a tractive belt frame mounted at the rear end of the main frame, a fender frame mounted on said auxiliary frame, a brace on said fender frame, a pivot mounted on the main frame supporting said brace, means connected with the tractive belt frame and the main frame for dropping corn at predetermined intervals.

3. In a check row attachment for corn planters provided with a main frame, a tractive belt frame, a shaft mounted therein, a transmission shaft driven by the tractive belt mounted at one end of said frame, a fender mounted on said tractive belt frame and pivoted to the main frame in advance of the tractive belt frame, an actuating wheel mounted on the transmission shaft, and means connected with the actuating wheel for dropping corn at predetermined intervals.

4. In a check row attachment for corn planters a main frame wheel-supported, an actuating wheel mounted thereon, an auxiliary frame pivoted thereto and supporting a traction belt in contact with the ground, a bell-crank lever, means connected with said wheel for driving said lever, a pair of seed boxes, means for opening and closing said seed boxes with every revolution of the actuating wheel, and means connected with said main frame and said auxiliary frame for lifting said auxiliary frame out of contact with the ground.

5. In a check row attachment for the main frame of a corn planter, an actuating wheel, means connected with the ground for driving said wheel, a fender attached to said driving means and to the main frame, a rocker shaft, means connected with said rocker shaft and said actuating wheel for driving said shaft and for dropping corn at predetermined intervals, a second rocker shaft, crank arms mounted on the extremities of said shaft, pressure bars mounted at the extremities of said crank arms for marking the position of the hills and means connected with said first rocker shaft for driving said second rocker shaft.

6. A check row attachment for the main frame of a corn planter, comprising a belt supporting frame, means mounted in the main frame for dropping corn at predetermined intervals, a fender connected with the belt supporting frame, a link connecting said fender and said main frame and means for upward and downward displacement of said frame and said fender.

In testimony whereof we have hereunto affixed our signatures in the presence of two witnesses.

FRANK B. SNAVELY.
ALBERT J. ULVESTAD.

Witnesses:
F. M. McCaulley,
John Rasmess.

Copies of this patent may be obtained for five cents each, by addressing the "Commissioner of Patents, Washington, D. C."